United States Patent
Lee et al.

(10) Patent No.: US 12,326,331 B2
(45) Date of Patent: *Jun. 10, 2025

(54) ROLL MAP GENERATING DEVICE FOR MERGE-WOUND ELECTRODE

(71) Applicant: LG ENERGY SOLUTION, LTD., Seoul (KR)

(72) Inventors: Dong Yeop Lee, Daejeon (KR); Jong Seok Park, Daejeon (KR); Jun Hyo Su, Daejeon (KR); Ki Deok Han, Daejeon (KR); Byoung Eun Han, Daejeon (KR); Seung Huh, Daejeon (KR); Su Wan Park, Daejeon (KR); Gi Yeong Jeon, Daejeon (KR); Jae Hwan Lee, Daejeon (KR); Min Su Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/277,288

(22) PCT Filed: Nov. 7, 2022

(86) PCT No.: PCT/KR2022/017354
§ 371 (c)(1),
(2) Date: Aug. 15, 2023

(87) PCT Pub. No.: WO2023/080747
PCT Pub. Date: May 11, 2023

(65) Prior Publication Data
US 2024/0151524 A1    May 9, 2024

(30) Foreign Application Priority Data
Nov. 8, 2021 (KR) .......... 10-2021-0152305

(51) Int. Cl.
G01B 21/22 (2006.01)
H01M 10/04 (2006.01)

(52) U.S. Cl.
CPC ........ G01B 21/22 (2013.01); H01M 10/0409 (2013.01)

(58) Field of Classification Search
CPC ..................................................... G01B 21/22
See application file for complete search history.

(56) References Cited

U.S. PATENT DOCUMENTS

2015/0115976 A1   4/2015   Adams et al.
2016/0179285 A1   6/2016   Lee
(Continued)

FOREIGN PATENT DOCUMENTS

JP   H09-194090 A     7/1997
JP   2008127093 A  *  6/2008
(Continued)

OTHER PUBLICATIONS

Machine translation of KR10-2043021 B1 (Year: 2019).*
V Machine translation of JP2008-127093 A (Year: 2008).*

*Primary Examiner* — Lee E Rodak
*Assistant Examiner* — Sangkyung Lee
(74) *Attorney, Agent, or Firm* — Bryan Cave Leighton Paisner LLP

(57) ABSTRACT

An apparatus for generating a roll map of a merge-wound electrode includes a position measurement device configured to acquire coordinate value data for a longitudinal position of a merged-wound electrode, an input device configured to input an input signal indicating a start of merge-winding or an end of merge-winding, a seam detector configured to detect a seam and acquire electrode coordinate values of the seam, and a reference point detector configured to detect reference points of the merge-wound electrode and acquire electrode coordinate values of the reference points.

(Continued)

A roll map for simulating the merge-wound electrode is generated based on the input signal of the input device, the electrode coordinate values of the seam, and the electrode coordinate values of the reference points of the merge-wound electrode.

20 Claims, 8 Drawing Sheets

(56) References Cited

U.S. PATENT DOCUMENTS

| | | |
|---|---|---|
| 2018/0162668 A1 | 6/2018 | Hong |
| 2019/0298218 A1 | 10/2019 | Nebuya et al. |
| 2020/0348242 A1 | 11/2020 | Watanabe |
| 2021/0151786 A1* | 5/2021 | Hatakenaka ............... G06F 3/14 |

FOREIGN PATENT DOCUMENTS

| | | | |
|---|---|---|---|
| JP | 2009266739 A | | 11/2009 |
| JP | 5979100 B2 | | 8/2016 |
| JP | 6752483 B2 | | 9/2020 |
| KR | 10-2006-0085440 A | | 7/2006 |
| KR | 10-0819183 B1 | | 4/2008 |
| KR | 10-1275815 B1 | | 6/2013 |
| KR | 10-2013-0105001 A | | 9/2013 |
| KR | 10-2014-0069900 A | | 6/2014 |
| KR | 10-1471473 B1 | | 12/2014 |
| KR | 10-1573588 B1 | | 12/2015 |
| KR | 10-1695650 B1 | | 1/2017 |
| KR | 10-1731983 B1 | | 5/2017 |
| KR | 102043024 B1 | * | 11/2019 |
| KR | 10-2206908 B1 | | 1/2021 |
| WO | 2009014818 A1 | | 1/2009 |

\* cited by examiner

[FIG. 1]
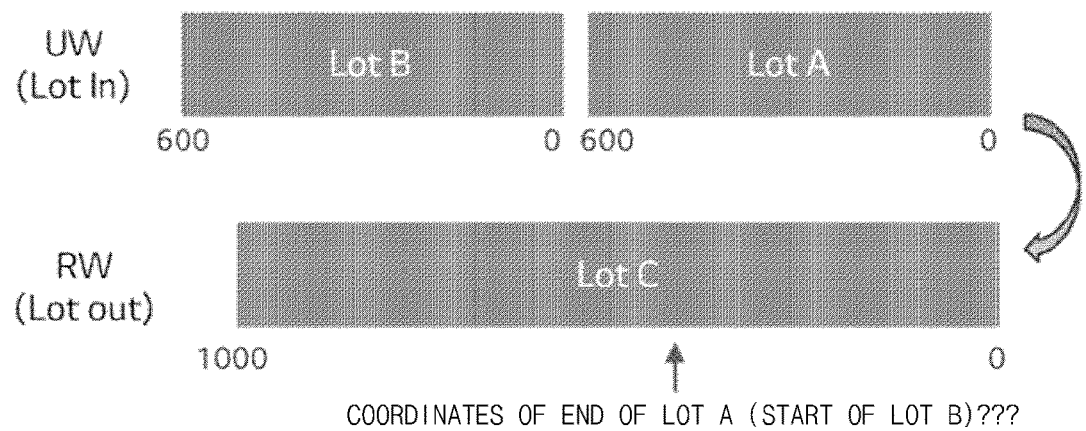

[FIG. 2]
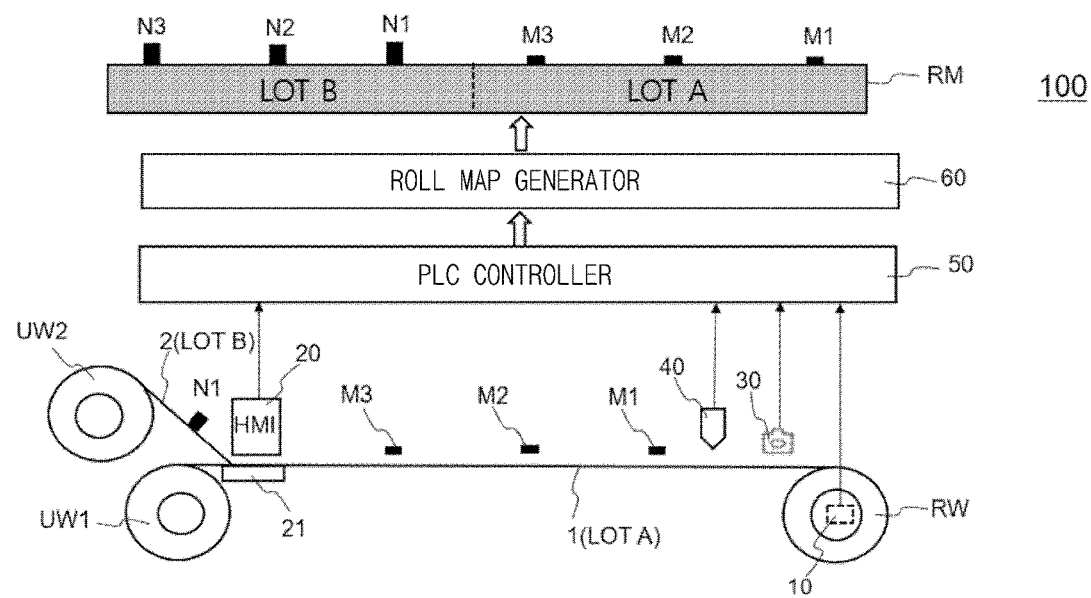

[FIG. 3]
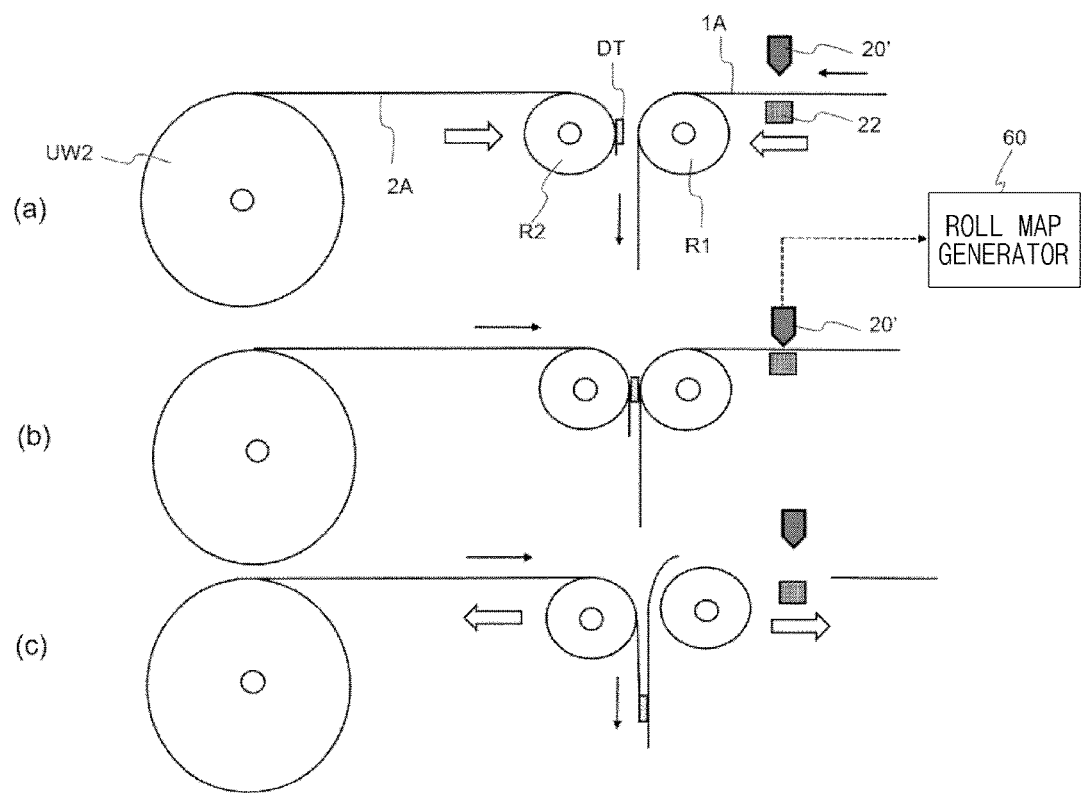

[FIG. 4]
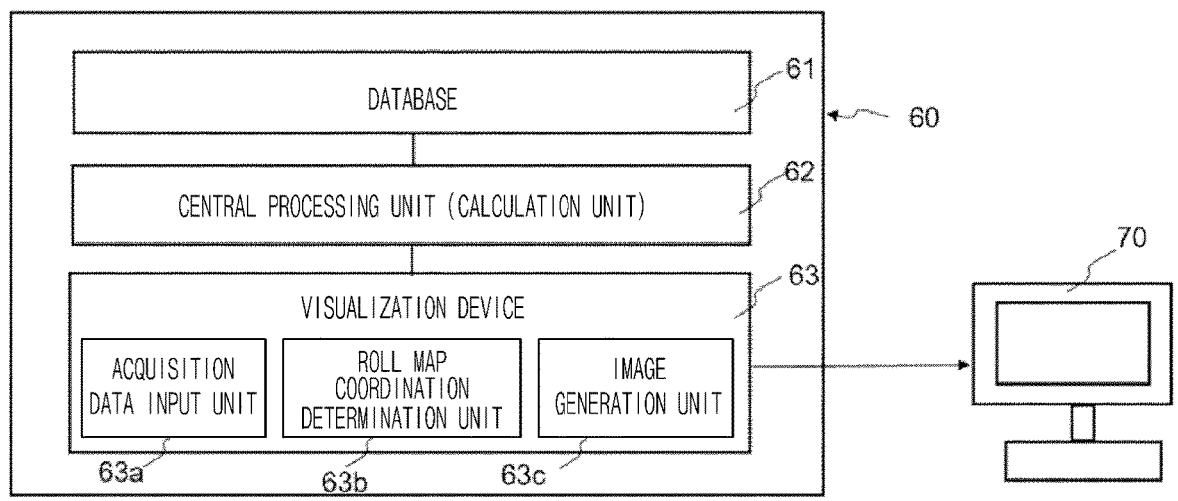

[FIG. 5]
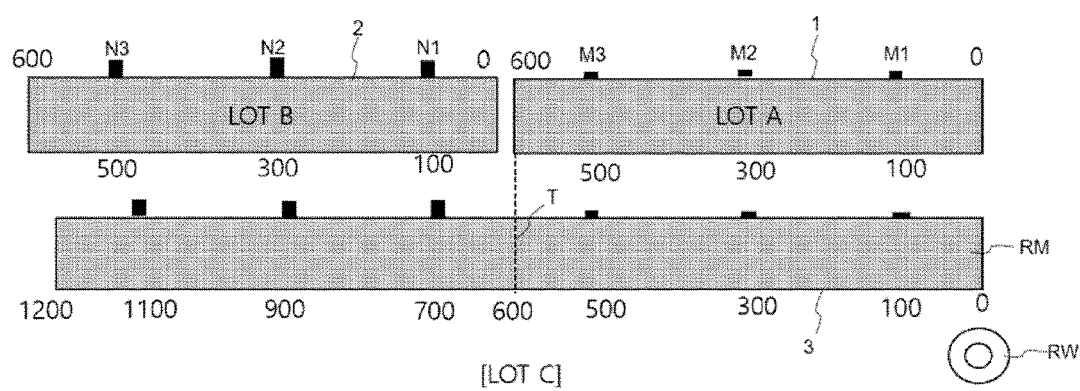
[LOT C]

[FIG. 6]
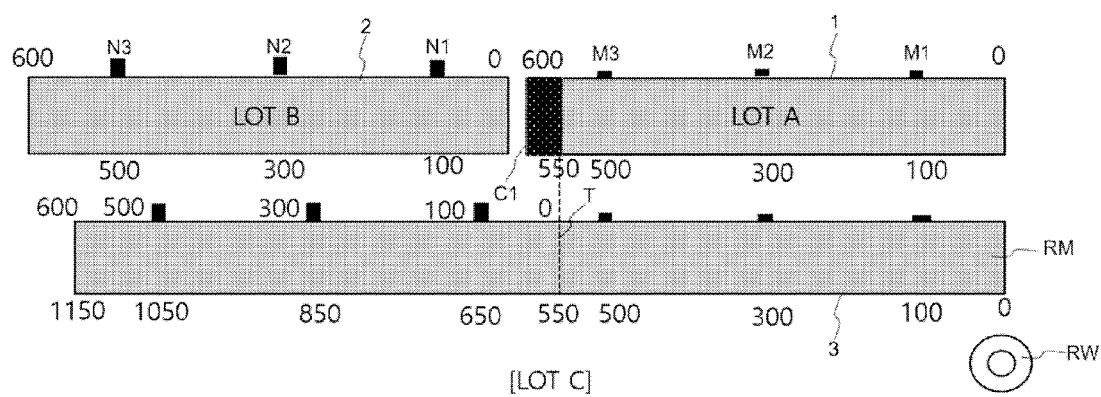
[LOT C]

[FIG. 7]
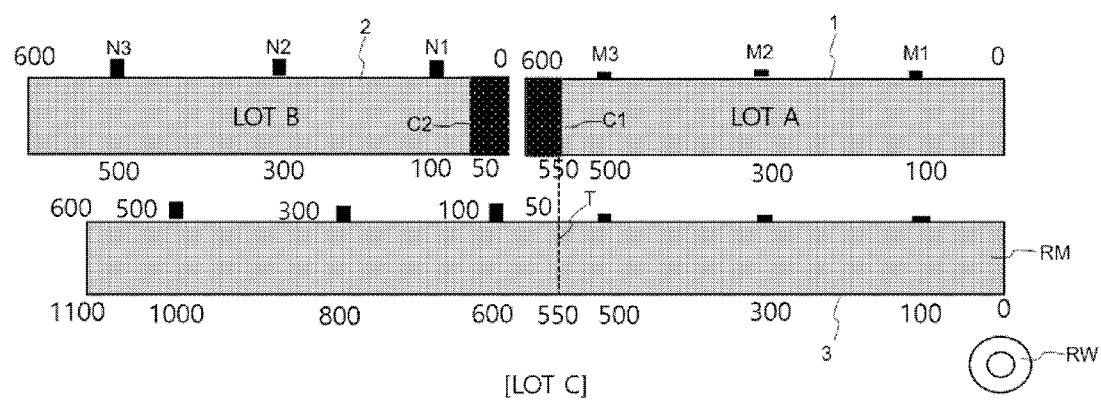
[LOT C]

[FIG. 8]
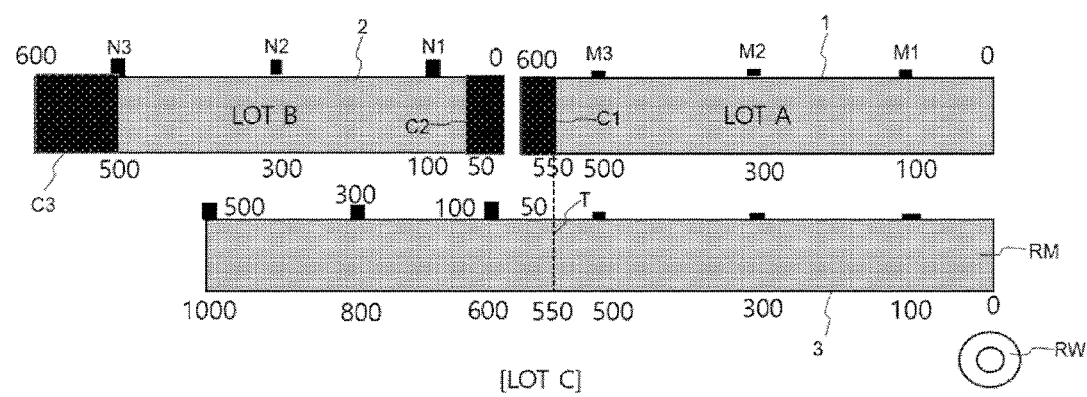
[LOT C]

ROLL MAP GENERATING DEVICE FOR MERGE-WOUND ELECTRODE

CROSS-REFERENCE TO RELATED APPLICATION(S)

This application is a National Phase entry pursuant to 35 U.S.C. 371 of International Application No. PCT/KR2022/017354 filed on Nov. 7, 2022, which claims priority to and the benefit of Korean Patent Application No. 10-2021-0152305, filed on Nov. 8, 2021, the disclosure of which is incorporated herein by reference in its entirety.

TECHNICAL FIELD

The present disclosure relates to an apparatus for generating a roll map of a merge-wound electrode in which a plurality of electrodes are merged and wound.

BACKGROUND

As technology for mobile devices has developed and the demand for such mobile devices has increased, the demand for secondary batteries has also rapidly increased. Among secondary batteries, lithium secondary batteries have high energy density and operating voltage and excellent storage and lifetime characteristics and thus are widely used as energy sources for various types of electronic products as well as various types of mobile devices.

An electrode manufacturing process of manufacturing an electrode of a lithium secondary battery includes a plurality of detailed processes such as a coating process of applying an active material and a certain insulating material on a surface of a metal electrode plate, which is a current collector, and forming a positive electrode and a negative electrode, a roll press process of rolling the coated electrodes, and a slitting process of cutting the rolled electrodes according to dimensions.

Electrodes manufactured in the electrode manufacturing process are assembled through an assembly process in which an electrode tab is formed through a notching process, a separator is interposed between a positive electrode and a negative electrode to form an electrode assembly, the electrode assembly is stacked or folded to be packaged with a pouch or can, and an electrolyte is injected to manufacture a shape of a secondary battery. Thereafter, the assembled secondary battery becomes a secondary battery as a final product through an activation process of performing charging and discharging to impart battery characteristics.

The electrode manufacturing process is performed in a roll-to-roll state in which an electrode roll is moved between an unwinder and a rewinder. Typical normal electrode rolls (jumbo rolls) have different lengths according to types thereof but have an electrode length of, for example, 2,000 m to 3,000 m in total. However, when the electrode manufacturing process is performed, there are cases in which an entire electrode cannot be used in relation to a subsequent process, and a scrap electrode having a length of about several hundred meters inevitably remains. Alternatively, there are cases in which a large number of defects occur, the defected portions are cut, and a portion of a normal electrode remains. In consideration of productivity, there are cases in which, without discarding such scrap electrodes, a plurality of electrodes are bundled and merged and wound to have a standard winding diameter (lot merge).

FIG. 1 shows schematic diagrams illustrating that electrodes to be merged of different lots are input from an unwinder UW and connected to each other, and a connected new electrode is wound (merge-wound) on a rewinder RW.

As shown, electrodes of lots A and B each have a length of 600 m. For example, when it is assumed that scrap electrodes are connected to manufacture a new electrode (lot C) of 3,000 m in total, five electrodes having a length of 600 m only need to be merged and wound.

When a plurality of electrodes are connected, typically, a start end portion or a rear end portion of one electrode is cut and connected. Therefore, in most cases, a length of a merge-wound new electrode is different from the sum (1,200 m) of lengths of electrodes to be merged. That is, although electrodes unwound through an unwinder each have a length of 600 m and thus have a total length of 1,200 m, a total length of an electrode wound on a rewinder may be measured to be 1,000 m. Conventionally, only a total length of a new electrode of lot C was measured by an encoder of a rewinder during merge-winding, and a detailed configuration of the new electrode of lot C (electrode length or electrode coordinate values of lots A and B) was not managed. Thus, it was not possible to determine where electrode coordinate values of a terminal end portion of lot A and electrode coordinate values of a start end portion of lot B were in the new electrode of lot C. Therefore, when a defect occurred in a notching electrode or electrode assembly manufactured with the electrode of lot C in a subsequent process such as a notching or assembly process, since it was not possible to determine exactly from which portion of the electrode of lot C the notching electrode was derived, quality tracking for determining a cause of the defect was actually impossible. In addition, when a problem occurred in a battery which was a final product manufactured with the electrode of lot C, by tracing the battery back to the notching process, it was possible to find a portion of the electrode from which the battery was derived. Since specific coordinates of raw material electrodes of lots A and B of the merge-wound electrode of lot C could not be found, it was difficult to accurately determine the cause of a defect.

In addition, the present applicant has recently developed technology related to a roll map in which movement of an electrode moving in a roll-to-roll state is simulated and displayed in a bar form in an electrode manufacturing process. In a roll map, an electrode in a roll-to-roll state may be simulated to display data about quality or a defect on the roll map in the form of a bar displayed on a screen, data about quality or a defect in an electrode coating process can easily be visually understood at a glance.

Such a roll map may be generated for each of detailed processes such as an electrode coating process, a roll press process, and a slitting process. For example, information about a roll map generated in a first process may be used in a second process, and in the second process, defects and the like may be removed with reference to the roll map of the first process. However, in the first process, in a case in which scrap electrodes are merged and wound into the new electrode of lot C as described above, when a length of an electrode is changed as shown in FIG. 1, coordinate values of the electrode should be corrected according to the changed length. When the coordinate values of the electrode are not corrected despite the length of the electrode having changed, an accurate subsequent operation cannot be performed in the second process. In addition, as described above, in a case in which a plurality of electrodes are merged and wound and a problem occurs in a product manufactured with the merge-wound electrode, when a length or coordinates of each electrode constituting a new electrode can be accurately displayed on a roll map, quality tracking or reverse tracking can be easily performed for each defect type.

Therefore, there is a need for a technology related to a roll map allowing quality to be easily tracked when a plurality of electrodes are merged and wound.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

RELATED ART DOCUMENTS (Patent Document] Korean Patent Registration No. 10-1731983 (May 2, 2017).

SUMMARY

An object of the present disclosure is to provide an apparatus for generating a roll map of a merge-wound electrode in which coordinate information of a merge-wound electrode is accurately reflected in a merge winding process of connecting a plurality of different electrodes, thereby tracking quality based on electrode coordinates.

An apparatus for generating a roll map of a merge-wound electrode according to one embodiment of the present disclosure includes a position measurement device configured to acquire, when an electrode moves in a roll-to-roll state between an unwinder and a rewinder, coordinate value data for a longitudinal position of the electrode according to an amount of rotation of the rewinder, an input device configured to input, when two or more electrodes to be merged that are each marked with a plurality of reference points at one or more intervals that are connected to be merged and wound into the merge-wound electrode, an input signal indicating a start of merge-winding or an end of merge-winding, a seam detector configured to detect a seam, which is an electrode to be merged connection portion of the merge-wound electrode, and to acquire electrode coordinate values of the seam, a reference point detector configured to detect a plurality of reference points of the merge-wound new electrode and to acquire electrode coordinate values of the plurality of reference points of the merge-wound, and a roll map generator configured to generate a roll map for simulating the merge-wound electrode moving in a roll-to-roll state based on the input signal of the input device, and to display the longitudinal coordinate values of the electrode, the electrode coordinate values of the seam, and the electrode coordinate values of the plurality of the reference points of the merge-wound electrode on the roll map in conjunction with the position measurement device, the seam detector, and the reference point detector.

As an example, the position measurement device may be a rotary encoder configured to extract an electrode position from an amount of rotation of a motor configured to drive the rewinder.

The input device may be an automatic or manual input device.

The input device may be a human machine interface (HMI) control button displayed on a touch screen.

As another example, the input signal may be a splicing operation start or end signal for connecting the electrodes to be merged, which is automatically or manually input.

In addition, the roll map generator may include a visualization device configured to define a visualization area in which the roll map for simulating the merge-wound electrode is to be generated, to display coordinate value data of the merge-wound electrode on the defined visualization area, and to visualize the seam and the plurality of reference points of the merge-wound electrode based on the electrode coordinate value data of the seam and coordinate value data of the plurality of reference points of the merge-wound electrode.

As an example, the apparatus may further include a controller configured to control electrode a movement of the electrode between the unwinder and the rewinder, and the controller may be connected to the input device, the position measurement device, the seam detector, and the reference point detector to transmit the input signal of the input device, the coordinate value data about the longitudinal position of the electrode, the electrode coordinate values of the seam, and coordinate value data of the plurality of reference points of the merge-wound electrode to the roll map generator.

As a specific example, the roll map generator may be a manufacturing execution system (MES) or a component of the MES.

As an example, the roll map generator may be configured to compare coordinate values of the plurality of reference points of the merge-wound electrode detected by the reference point detector with the one or more intervals between the plurality of reference points marked on the two or more electrodes to be merged to calculate a change amount of an electrode length during merge-winding and may utilize the change amount to correct the longitudinal coordinate values of the electrode on the roll map and display the corrected longitudinal coordinate values on the roll map.

Specifically, the two or more electrodes to be merged may each be marked with the plurality of reference points, and the coordinate values of the plurality of reference points of the merge-wound electrodes derived from each of the two or more electrodes to be merged may be compared with the one or more intervals between the plurality of reference points of each of the two or more electrodes to be merged to calculate the change amount of the electrode length during merging and winding of the two or more electrodes to be merged.

More specifically, the coordinate values of the plurality of reference points of the merge-wound electrode derived from each of the two or more electrodes to be merged may be compared with the one or more intervals between the plurality of reference points of each of the two or more electrodes to be merged and the electrode coordinate values of the seam acquired by the seam detector to calculate the change amount of the electrode length during merging and winding of the two or more electrodes to be merged.

In addition, a length of each of the one or more intervals between the plurality of reference points of each of the two or more electrodes to be merged may be the same.

According to the present disclosure, it is possible to automatically generate a roll map through which detailed coordinate information of a merge-wound electrode can be reflected.

Accordingly, electrode quality can be easily tracked based on electrode coordinates of the merge-wound electrode.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 shows schematic diagrams illustrating that electrodes to be merged of different lots are input from an unwinder (UW) and connected to each other, and a connected new electrode is wound (merge-wound) on a rewinder (RW).

FIG. 2 is a schematic diagram illustrating an apparatus for generating a roll map of a merge-wound electrode according to one embodiment of the present disclosure.

FIG. 3 shows an embodiment showing an example in which, when electrodes to be merged are spliced, an input signal indicating a start of merge-winding is automatically input.

FIG. 4 is a block diagram illustrating an example of a configuration of a roll map generator which generates a roll map of a merge-wound electrode.

FIG. 5 illustrates an example of a roll map generated by an apparatus for generating a roll map of the present disclosure.

FIGS. 6 to 8 shows schematic diagrams illustrating various embodiments of a roll map displayed after longitudinal coordinate values of an electrode are corrected by an apparatus for generating a roll map of the present disclosure.

DETAILED DESCRIPTION

Hereinafter, the detailed configuration of the present disclosure will be described in detail with reference to the accompanying drawings and various embodiments. Embodiments to be described below are described for easy understanding of the present disclosure. Also, for easy understanding of the present disclosure, the accompanying drawings are not drawn to scale, and the dimensions of some components may be exaggerated.

While the present disclosure is open to various modifications and alternative embodiments, specific embodiments thereof will be described and illustrated by way of example in the accompanying drawings. However, this is not purported to limit the present disclosure to a specific disclosed form, but it shall be understood to include all modifications, equivalents and substitutes within the idea and the technological scope of the present disclosure.

FIG. 2 is a schematic diagram illustrating an apparatus for generating a roll map of a merge-wound electrode according to one embodiment of the present disclosure.

An apparatus 100 for generating a roll map according to one embodiment of the present disclosure includes a position measurement device 10 configured to acquire, when an electrode moves in a roll-to-roll state between an unwinder UW and a rewinder RW, coordinate value data for a longitudinal position of the electrode according to an amount of rotation of the rewinder RW, an input device 20 may be configured to input, when two or more electrodes to be merged 1 and 2 that are each marked with a plurality of reference points at certain intervals are connected to be merged and wound into one new electrode 3, an input signal indicating a start or end of merge-winding, a seam detector 30 configured to detect a seam T, which is an electrode to be merged connection portion of the merge-wound new electrode 3, and acquire electrode coordinate values of the seam T in conjunction the position measurement device 10, a reference point detector 40 configured to detect reference points of the merge-wound new electrode 3 and acquire electrode coordinate values of the reference points in conjunction with the position measurement device 10, and a roll map generator 60 configured to generate a roll map RM for simulating the new electrode 3 moving in a roll-to-roll state based on the input signal of the input device 20 and display longitudinal coordinate values of the electrode, the electrode coordinate values of the seam T, and the electrode coordinate values of the reference points on the roll map RM in conjunction with the position measurement device 10, the seam detector 30, and the reference point detector 40.

The apparatus 100 for generating a roll map of the present disclosure includes the position measurement device 10, the input device 20, the seam detector 30, the reference point detector 40, and the roll map generator 60.

In an electrode manufacturing process, an electrode is placed between the unwinder UW and the rewinder RW. After the electrode is unwound from the unwinder UW and a certain process is completed, the electrode is wound on the rewinder RW to become an electrode roll. In addition, the electrode roll on which one process (the previous process) is completed is placed again between the unwinder UW and the rewinder RW in a subsequent process and is moved in a roll-to-roll state to be subjected to the subsequent process. That is, in the electrode manufacturing process, a process of moving an electrode in a roll-to-roll state is repeated. Therefore, when a position during movement of an electrode can be expressed in coordinates, a position of the electrode in each process can be specified. In addition, in a case in which data about quality or defects is acquired, an event such as a fracture of an electrode occurs, and the fractured electrode is connected through a seam connection member T, when a position of a seam or a portion at which the data is acquired can be expressed in coordinates, it is possible to display history information about quality, defects, and various events of the electrode in a corresponding process. Since the electrodes move according to rotation of the unwinder UW and the rewinder RW, longitudinal positions of the electrodes 1, 2, and 3 may be specified according to an amount of rotation of the unwinder UW and the rewinder RW. In the present disclosure, since the electrodes to be merged 1 and 2 are connected to be merged and wound into the new electrode 3 on the rewinder RW, the longitudinal positions of the electrodes are specified according to an amount of rotation of the rewinder. Therefore, in the present disclosure, coordinate value data of the longitudinal positions of the electrodes 1, 2, and 3 may be detected by a rotary encoder 10 installed in the rewinder RW. In general, the rotary encoder 10 is installed in a motor driving unit that drives the unwinder UW and the rewinder RW to detect an electrode movement distance according to the number of revolutions (amount of rotation) of a motor. Therefore, when the electrodes 1, 2, and 3 move between the unwinder UW and the rewinder RW, a movement distance thereof may be detected by the rotary encoder 10.

A facility such as a manufacturing execution system (MES) for manufacturing an electrode or a controller for controlling a roll-to-roll transfer process of an electrode does not recognize merge-winding unless a merge-winding signal is input. Accordingly, the apparatus does not know coordinates of an end point of the electrode 1 of lot A to be merged and wound. Therefore, in order to find coordinate values of electrodes to be merged and wound and generate the roll map RM, the apparatus 100 for generating a roll map of the present disclosure includes the input device 20 capable of receiving an input signal indicating a start or end of merge-winding.

In this case, the plurality of reference points are marked on each of the connected electrodes to be merged (electrode 1 of lot A and electrode 2 of lot B) at certain intervals. Referring to FIG. 2, each of three reference points M1, M2, and M3 is marked on the electrode 1 of lot A, and each of three reference points N1, N2, and N3 is also marked on the electrode 2 of lot B. The reference points serve as criteria for calculating a change amount of an electrode length during merge-winding. That is, when the reference point is not marked and the reference point detector 40 is not present, only electrode coordinate values of the seam may be obtained by the seam detector. In order to find exact coordinate values of each electrode (lot A or B) constituting the new electrode (lot C) by reflecting a change amount of an electrode length, the reference point detector 40 capable of obtaining the reference points and coordinate values of the reference points is required.

When the input signal is received by the input device 20, a system (for example, the MES) is informed that a current roll-to-roll transfer process is a merge-winding transfer process. In addition, for example, the MES or the roll map generator 60, which is a component of the MES, generates the roll map RM of the merge-wound electrode (lot C) based on the input signal. Therefore, the input device 20 of the present disclosure is important in that the input device 20 specifies a cause of electrode connection and imparts a roll map generating signal.

The input device 20 may be provided as an automatic or manual input device. FIG. 2 shows an example in which the input device 20 is a manual input device. When an operator connects the electrode to be merged 1 of lot A and the electrode to be merged 2 of lot B on a splicing table 21, upon starting or ending an operation, the operator may press a button of the manual input device connected to the roll map generator 60 to input an input signal for starting or ending merge-winding. For example, the manual input device may be a human machine interface (HMI) control button 20 displayed on a touch screen. On the splicing table 21, the operator may press the HMI control button before connecting the electrodes to be merged 1 and 2 or may press the HMI control button after connecting the electrodes to be merged 1 and 2. The HMI control button may be generated through known HMI forming solutions such as HMI generation software and hardware such as a touch panel screen, a computer, and a device for transmitting data to the roll map generator. Therefore, a detailed description thereof is omitted in the present specification.

The input signal may also be a splicing operation start or end signal for connecting the electrodes to be merged, which is automatically or manually input. The splicing operation start or end signal that is manually input may be input through the HMI control button input by the operator as described above.

FIG. 3 shows an embodiment showing an example in which, when electrodes to be merged are spliced, an input signal indicating a start of merge-winding is automatically input.

As shown, a terminal end portion 1A of an electrode derived from an roll UW1 of electrode to be merged of lot A and a start end portion 2A of an electrode derived from another roll UW2 of electrode to be merged are connected. For example, in a standby state of another roll UW2 of electrode to be merged as shown in FIG. 3A, when an electrode end signal of the roll of electrode to be merged is received by a roll diameter sensor (not shown) installed on the roll UW1 of electrode to be merged, a press roll R1 on which the terminal end portion 1A of the electrode to be merged is wound and a press roll R2 by which the start end portion 2A of another electrode to be merged is pressed are driven to approach each other (see FIG. 3B). Since a double-sided tape 3 is attached to the start end portion 2A of another roll of electrode to be merged, the electrodes to be merged are bonded by being pressed by the press rolls. After the bonding is completed, when a cutter 20' installed near the terminal end portion 1A of the electrode to be merged is lowered to cut the electrode to be merged, the electrode of another roll of electrode to be merged connected to the roll of electrode to be merged move towards the rewinder (not shown) in a roll-to-roll state. Accordingly, a roll-to-roll transfer from the unwinder to the rewinder can be continuously performed without interruption. A support 22 is installed on a rear surface of the electrode such that the cutter 20' may easily cut the electrode. In this case, the descent (see FIG. 3B) or the ascent (see FIG. 3C) of the cutter 20' becomes a signal indicating a start or end of merge-winding (splicing). More precisely, an operation signal of a motion sensor, which is installed in an elevating cylinder or the like connected to the cutter 20' that cuts the electrode to be merged 1, becomes a start or end signal for merge-winding. The motion sensor is connected to the roll map generator 60 to automatically transmit an input signal related to merge-winding. As will be described below, the roll map generator 60 recognizes merge-winding based on the input signal and generates the roll map RM based on coordinate values by the position measurement device 10 or the like.

When the electrodes to be merged are connected through merge-winding, the seam detector 30 detects a seam attached to the electrodes or a seam connection member T (for example, a connection tape). When the seam detector 30 detects the seam connection member T, a system or facility recognizes that the electrodes are connected for some reason. Referring to FIG. 2, the electrodes are transferred in a roll-to-roll state from the unwinder UW to the rewinder RW, and a merge-winding input signal has already been input from the splicing table 21 at an unwinder side, when the seam detector 30 near the rewinder RW detects a seam, it is recognized or identified that the seam is formed due to merge-winding.

The seam detector 30 may be connected to the rotary encoder 10 in a wired or wireless manner to obtain an encoder value when the seam connection member T is detected. From the encoder value, the seam detector 30 may acquire electrode coordinate value data about a position of the seam connection member T. Therefore, in order to correct roll map coordinates, the existence of the seam connection member T and the acquisition of coordinate values thereof should be performed in advance. The seam detector 30 may be, for example, a color sensor. Since a connection tape usually has a different color from an electrode, the color sensor may detect the connection tape which is a portion having a different color from the electrode.

The reference point detector 40 may interwork with the encoder to acquire position coordinate data of the reference points M1, M2, and M3 of the old electrode 1. That is, the reference point detector 40 may be connected to the encoder in a wired or wireless manner to obtain an encoder value when a reference point is detected. Accordingly, the reference point detector 40 may acquire data about position coordinate values of the reference points M1, M2, and M3 marked on the electrode 1. In addition, when the electrode to be merged 1 and the electrode to be merged 2 are merged and wound (spliced) and continuously moved toward the rewinder RW, coordinate value data of the reference points N1, N2, and N3 marked on the electrode to be merged 2 may also be obtained. The reference point detector 40 may be an optical character recognition (OCR) reader capable of reading printed characters through OCR. Alternatively, a vision camera equipped with a vision sensor and capable of detecting the reference points M1, M2, and M3 (N1, N2, and N3) may be adopted as the reference point detector 40.

Referring to FIG. 2 again, the apparatus 100 of the present disclosure includes the roll map generator 60 which generates the roll map RM for simulating the new electrode 3 moving in a roll-to-roll state based on the input signal of the input device 20 and interworks with the position measurement device 10, the seam detector 30, and the reference point detector 40 to display longitudinal coordinate values of an electrode, electrode coordinate values of a seam, and electrode coordinate values of reference points on the roll map RM.

FIG. 4 is a block diagram illustrating an example of a configuration of the roll map generator 60 which generates a roll map RM of a merge-wound electrode.

The roll map generator 60 may include a database 61 which stores data acquired from the position measurement device 10, the seam detector 30, and the reference point detector 40 or stores information such as lengths of electrodes to be merged, which are scrap electrodes, and the number of reference points or intervals therebetween.

In addition, as will be described below, the roll map generator 60 includes a central processing unit 62 (calculation unit) which calculates a change amount of an electrode length during merge-winding based on data stored in the database 61 and reflects the calculated change amount to correct longitudinal coordinate values of an electrode on the roll map RM. The central processing unit 62 may also process acquired data and instruct a visualization device 63 provided in the roll map generator 60 to visualize the processed data.

That is, the roll map generator 60 includes the visualization device 63 configured to define a visualization area in which the roll map for simulating the electrode 3 is to be generated and display coordinate value data on the defined area. The visualization device 63 may visualize and display the seam and the reference point at positions of coordinate value data of the seam and the reference point.

Referring to FIG. 4, the visualization device 63 includes an acquisition data input unit 63a, a roll map coordinate determination unit 63b, and an image generation unit 63c.

First, the acquisition data input unit 63a receives data from the central processing unit 62.

The roll map coordinate determination unit 63b may define the visualization area in which the roll map is to be formed and may define pixel coordinate values in the visualization area for each data element of acquired source data. In this case, when data about specifications such as a lot number, length, and width of an electrode roll is registered as electrode roll information and is input to a controller 50 or a server, the roll map coordinate determination unit 63b may calculate and determine the visualization area of the roll map according to a certain scale conversion scale from data about a size of an electrode.

The coordinate determination unit 63b may map acquired quality or defect data and electrode position data (in width and length directions) and may allocate the mapped data on the visualization area (roll map) according to pixel coordinates.

The image generation unit 63c may express an element of the mapped data allocated to each pixel coordinate in the visualization area in one or more legends. The legends refer to various shapes such as a circular shape, a quadrangular shape, and a triangular shape displayed in the visualization area or shapes to which colors are imparted. Therefore, through the image generation unit 63c, at pixel coordinates (coordinates on the roll map) corresponding to each piece of position data of an actual electrode in the visualization area called a roll map, longitudinal coordinate value data of the electrode, coordinate values of a seam and a reference point are visually displayed on a display unit having a form, shape, and a color designated for each piece of data, thereby generating a roll map of the present disclosure.

In addition, based on data stored in a storage unit such as the database 61, in conjunction with a specific range of the roll map, data corresponding to the specific range may be read from the storage unit and displayed on a screen (image generation).

Setting a size of the visualization area or generating an image by finding coordinates of the visualization area may be performed using various conventional user interfaces or various programs or processing tools related to data allocation-processing-analysis and visualization. Accordingly, the above-described roll map generator 60 is merely an example and is not limited to the above-described embodiment.

The above-described roll map generator 60 may be a data processing system such as an MES or a component of the system. The data processing system is a system (including hardware or software) that performs input, processing, output, communication, and the like in order to perform a series of manipulations on data. In an electrode manufacturing process, an electrode MES is provided to manage a series of electrode manufacturing processes such as coating, pressing, and slitting processes. Accordingly, when the above-described coordinate data, inspection data, and the like are transmitted to the electrode MES, the above-described roll map may be generated by the electrode MES.

The apparatus 100 for generating a roll map of the present disclosure may include the controller 50 (PLC controller) which controls movement of electrodes between the unwinder UW and the rewinder RW. In this case, the controller 50 may be connected to the input device 20, the position measurement device 10, the seam detector 30, and the reference point detector 40 to transmit an input signal of the input device 20, coordinate value data about a longitudinal position of an electrode, coordinate values of a seam, and coordinate value data of a reference point to the roll map generator 60. In this case, the controller 50 may process the coordinate value data in a form that is easily processed in the roll map generator 60. Since the PCL controller 50 is connected to the encoder to control roll-to-roll transfer of electrodes, in terms of data processing and management, it is more efficient to transmit data through the controller 50 rather than directly transmitting data from the encoder or the like to the data processing system such as the electrode MES.

In addition, in the apparatus 100 for generating a roll map of the present disclosure, since the generated roll map is displayed on a display unit 70, it is possible to easily visually understand data related to a merge-wound electrode at a glance (see FIGS. 2 and 4).

The roll map generator 60 may be configured to compare coordinate values of reference points of the new electrode 3 detected by the reference point detector 40 with intervals between the reference points marked on the electrodes to be merged 1 and 2 to calculate a change amount of an electrode length during merge-winding and may reflect the calculated change amount to correct longitudinal coordinate values of an electrode on the roll map RM and display the corrected longitudinal coordinate values on the roll map RM. Accordingly, it is possible to generate the roll map RM of a merge-wound electrode having coordinates capable of reflecting the actual electrode 3 of which an electrode length is changed during merge-winding.

Specifically, the electrodes to be merged are marked with the plurality of reference points M1, M2, and M3 and N1, N2, and N3 and are merged and wound, and coordinate values of the reference points of the new electrode 3 derived from each of the electrodes to be merged 1 and 2 are compared with intervals between the plurality of reference points of the electrodes to be merged, thereby calculating a change amount of an electrode length during merge-winding.

In addition, since the roll map RM is a roll map of a merge-wound electrode, an end point of the electrode to be merged 1 and a start point of the electrode to be merged 2 to be merged and wound may be specified only when a coordinate position of a seam is specified. In addition, the coordinate values of the reference points of the new electrode derived from each of the electrodes to be merged are compared with the intervals between the plurality of reference points of each of the electrodes to be merged as well as electrode coordinate values of a seam acquired by the seam detector, and thereby a change amount of an electrode length during merge-winding can be more accurately calculated.

[Modes of the Disclosure]

Hereinafter, a process in which a roll map is generated by an apparatus for generating a roll map of a merge-wound electrode according to the present disclosure will be described with reference to various embodiments.

First Embodiment

FIG. 5 illustrates an example of a roll map generated by an apparatus 100 for generating a roll map of the present disclosure.

The upper drawing of FIG. 5 is a schematic diagram of scrap electrodes required to be merged and wound and illustrates electrodes to be merged 1 and 2 introduced from an unwinder. A plurality of reference points M1, M2, M3, N1, N2, and N3 are marked on the electrodes to be merged 1 and 2 at certain intervals. Intervals between the reference points of each electrodes to be merged may be the same or different. When the electrodes to be merged are merged and wound, the reference points also remain on a new electrode. Therefore, even if the electrodes to be merged have different intervals between the reference points, the intervals correspond to intervals between reference points of electrode to be merged portions which remain on the new electrode, and there is no problem in calculating a change amount of an electrode length by comparing the reference points. However, in the following embodiments, for convenience of description, intervals between the reference points marked on the different electrodes to be merged 1 and 2 are the same. In an electrode to be merged of lot A with a total length of 600 m, the reference points M1, M2, and M3 are marked at points of 100 m, 300 m, and 500 m. In an electrode to be merged of lot B with a total length of 600 m, the reference points N1, N2, and N3 are marked at points of 100 m, 300 m, and 500 m.

In the present embodiment, although the electrodes to be merged 1 and 2 of lot A and lot B are merged and wound, there is no change amount of an electrode length. An illustrated roll map RM shows an electrode wound on a rewinder being unwound in a length direction and simulates a new electrode 3 moving in a roll-to-roll state. Coordinate values displayed on the roll map RM are coordinate values at a time point at which winding is performed in a rewinder RW and include coordinate values acquired by a seam detector 30 and a reference point detector 40 which interlock with a position measurement device 10 of the rewinder.

As described above, when an input device 20 transmits a merge-winding start or end signal to a roll map generator 60, the roll map generator 60 generates the roll map RM by displaying coordinate value data detected later by the reference point detector 40, the seam detector 30, and the rewinder position measurement device 10 on a bar-shaped roll map.

In the first embodiment, electrode lengths of lots A and B are not changed, a terminal end portion of an electrode of lot A has a length of 600 m, and the seam detector 30 detects a seam connection member T at such coordinates. Since the electrode length is not changed, an interval between reference points is also unchanged. Therefore, the upper drawing (roll maps of the electrodes to be merged at an unwinder input side or absolute coordinate roll maps) and the lower drawing (a roll map of the new electrode at a rewinder discharge side or a relative coordinate roll map) of FIG. 5 are substantially the same, and there is no change in coordinate values. Such merge-winding is ideal, and in actual merge-winding, an electrode length is changed as in the following examples. The apparatus 100 for generating a roll map of the present disclosure specifies coordinates (600 m) of a seam in the new electrode of lot C and a length (600 m) of each of lot A and lot B. However, coordinate values of the reference points of the old electrode of lot B are added to coordinate values of the electrode to be merged of lot A through merge-winding and displayed in the new electrode of lot C (in the lower drawing of FIG. 5, the reference points N1, N2, and N3 are changed from 100, 300, and 500 to 700, 900, and 1100, respectively). As described above, according to the present disclosure, since coordinates of the seam in the new electrode of lot C, lengths of the electrodes to be merged constituting the new electrode of lot C, and coordinate values of the reference points are clearly specified, even if a defect occurs in a subsequent process, quality can be easily tracked using a roll map of the new electrode of lot C.

Second Embodiment

FIG. 6 shows schematic diagrams illustrating an example of a roll map RM displayed after longitudinal coordinate values of an electrode are corrected by an apparatus 100 for generating a roll map of the present disclosure.

In the present embodiment, a terminal end portion of an electrode to be merged 1 of lot A is cut 50 m and then connected to a start end portion of an electrode to be merged 2 of lot B through a seam. In consideration of a cut terminal end portion C1, an interval between a reference point M3 of the electrode to be merged 1 of lot A and a coordinate value of a seam T is changed into 50 m. Accordingly, a length of the electrode to be merged 1 of lot A is 550 m, and the coordinate value of the seam, which is a terminal end portion of the electrode to be merged 1, is also 550 m.

Since the electrodes to be merged 1 and 2 are connected at a point of 550 m, coordinates of the start end portion of the electrode to be merged 2 are also positioned at 550 m. In this case, since an interval between reference points of the electrode to be merged 2 is not changed, each length of the electrode to be merged 2 may be added to a coordinate value of 550 m of the electrode to be merged 1 to obtain a roll map (relative coordinates) of a new electrode of lot C. From roll map information of the new electrode of lot C, the length of the electrode to be merged of lot A is 550 m, and an interval between reference points of lot A is changed (an interval between the reference point M3 and the terminal end portion is decreased from 100 to 50). Thus, it is possible to find a change amount of an electrode length during merge-winding (50 m reduction in total length). In addition, from the roll map information of the new electrode of lot C, the length of the electrode to be merged of lot B constituting the new electrode of lot C is 600 m, which is not changed, but due to merge-winding, an electrode coordinate value is changed into a value acquired by adding the electrode length of Lot A.

In the present embodiment as well, since coordinates of a seam in the new electrode of lot C, lengths of the electrodes to be merged constituting the new electrode of lot C, and coordinate values of the reference points are clearly specified, even if a defect occurs in a subsequent process, quality can be easily tracked using a roll map of the new electrode of lot C.

Third Embodiment

FIG. 7 shows schematic diagrams illustrating an example of a roll map RM displayed after longitudinal coordinate values of an electrode are corrected by an apparatus for generating a roll map of the present disclosure.

In the present embodiment, a roll map is shown in a case in which a terminal end portion of an electrode to be merged 1 of lot A is cut 50 m and a start terminal end portion of lot B is also cut 50 m, and then lots A and B are connected through a seam. In consideration of cut terminal end portions C1 and C2, an interval between a reference point M3 of the electrode to be merged 1 of lot A and a coordinate value of the seam is changed into 50 m. Accordingly, a length of the electrode to be merged 1 of lot A is 550 m, and the coordinate value of the seam, which is a terminal end portion of the electrode to be merged 1, is also 550 m.

Since the start end portion of an electrode to be merged 2 is also cut 50 m, an interval between a reference point N1 and the cut start end portion is changed into 50 m. By reflecting this, when coordinate values of subsequent reference points N2 and N3 and a terminal end portion of the electrode to be merged 2 are corrected, the lower drawing of FIG. 7 is obtained. The upper drawing of FIG. 7 may be regarded as an absolute coordinate roll map on which the cut portions C1 and C2 are displayed, and the lower drawing of FIG. 7 may be regarded as a relative coordinate roll map on which the cut portions C1 and C2 are already reflected and displayed.

From the lower drawing of FIG. 7, it can be seen that a length of the electrode to be merged 1 is 550 m, a length of the electrode to be merged 2 is also 550 m, and a length of a new electrode 3 is 1,100 m.

As described above, coordinate values of reference points of the new electrode 3 detected by a reference point detector 40 may be compared with an interval between reference points marked on the electrodes to be merged 1 and 2 to easily calculate a change amount of an electrode length during merge-winding.

In addition, by reflecting the change amount of the electrode length calculated when the roll map of the new electrode of lot C is generated, longitudinal coordinate values of an electrode on the roll map RM are corrected from absolute coordinates and displayed.

In the present embodiment as well, since coordinates (550 m) of a seam in the length (1,100 m) of the new electrode of lot C, a length (550 m) of each of the electrodes to be merged constituting the new electrode of lot C, and coordinate values of the reference point are clearly specified, even if a defect occurs in a subsequent process, quality can be easily tracked using a roll map of the new electrode of lot C.

Fourth Embodiment

FIG. 8 shows schematic diagrams illustrating various embodiments of a roll map displayed after longitudinal coordinate values of an electrode are corrected by an apparatus of generating a roll map of the present disclosure.

In the present embodiment, a terminal end portion of an old electrode 1 of lot A is cut 50 m, a start end portion of an electrode to be merged 2 of lot B is also cut 50 m, and then a terminal end portion of lot B is cut 100 m to be merged and wound into a new electrode of lot C. In consideration of a cut terminal end portion C1, an interval between a reference point M3 of the electrode to be merged of lot A and a coordinate value of a seam is changed into 50 m. Accordingly, a length of the electrode to be merged 1 of lot A is 550 m, and the coordinate value of the seam, which is a terminal end portion of the electrode to be merged 1, is also 550 m.

Since the start end portion of the electrode to be merged 2 is also cut 50 m, an interval between a reference point N1 and a cut start end portion C2 is changed into 50 m. By reflecting this, coordinate values of subsequent reference points N2 and N3 and the terminal end portion of the electrode to be merged 2 are corrected. In addition, when the coordinate value of the terminal end portion of the electrode to be merged 2 is also corrected by reflecting a 100 m cut portion C3, the lower drawing of FIG. 8 is obtained.

From the lower drawing of FIG. 8, it can be seen that a length of the electrode to be merged 1 is 550 m, a length of the electrode to be merged 2 is 450 m, and a total length of a new electrode 3 is 1,000 m. In addition, coordinate values of reference points of the new electrode derived from each electrode to be merged are also corrected according to a change amount of an electrode length.

In the present embodiment as well, since coordinates (550 m) of a seam in the length (1,000 m) of the new electrode of lot C, lengths of the electrodes to be merged (550 m of lot A and 450 m of lot B) constituting the new electrode of lot C, and coordinate values of the reference points are clearly specified, even if a defect occurs in a subsequent process, quality can be easily tracked using a roll map RM of the new electrode of lot C.

The present disclosure has been described above in more detail through the drawings and embodiments. However, the configurations described in the drawings or the embodiments in the specification are merely embodiments of the present disclosure and do not represent all the technical ideas of the present disclosure. Thus, it is to be understood that there may be various equivalents and variations in place of them at the time of filing the present application.

DESCRIPTIONS OF REFERENCE NUMERALS

1: electrode to be merged (lot A)
2: electrode to be merged (lot B)
3: new electrode (lot C)
UW, UW1, UW2: unwinder
RW: rewinder
10: position measurement device (rotary encoder)
20: input device (HMI control button)
20': (motion sensor of) cutter
21: splicing unit
22: support
30: seam detector
40: reference point detector 50: controller
60: roll map generator
6: database
62: central processing unit
63: visualization device
70: display unit
M1, M2, M3: reference point of electrode to be merged 1
N1, N2, N3: reference point of electrode to be merged 2
T: seam (connection member)
C1, C2, C3: cut portion
100: apparatus for generating roll map of merge-wound electrode

The invention claimed is:

1. An apparatus for generating a roll map of a merge-wound electrode, the apparatus comprising:
   a position measurement device configured to acquire, when the merged-wound electrode moves in a roll-to-roll state between an unwinder and a rewinder, coordinate value data for a longitudinal position of the merged-wound electrode;
   an input device configured to input, when two or more electrodes to be merged that are each marked with a plurality of reference points at one or more intervals are connected to be merged and wound into the merge-wound electrode, an input signal indicating a start of merge-winding or an end of merge-winding;
   a seam detector configured to detect a seam, which is a connection portion of two electrodes merged in the merge-wound electrode, and to acquire electrode coordinate values of the seam; and
   a reference point detector configured to detect a plurality of reference points of the merge-wound electrode corresponding to the plurality of reference points of the two or more electrodes to be merged and to acquire electrode coordinate values of the plurality of reference points of the merge-wound electrode,
   wherein a roll map for simulating the merge-wound electrode is generated based on the input signal, the electrode coordinate values of the seam, and the electrode coordinate values of the plurality of reference points of the merge-wound electrode.

2. The apparatus of claim 1, wherein the position measurement device is a rotary encoder configured to extract an electrode position from an amount of rotation of a motor configured to drive the rewinder.

3. The apparatus of claim 1, wherein the input device is an automatic or manual input device.

4. The apparatus of claim 3, wherein the input device is a human machine interface (HMI) control button displayed on a touch screen.

5. The apparatus of claim 1, wherein the input signal is a splicing operation start or end signal for connecting the electrodes to be merged, which is automatically or manually input.

6. The apparatus of claim 1, further comprising a roll map generator, wherein the roll map generator is configured to generate the roll map for simulating the merge-wound electrode that includes coordinate value data of the merge-wound electrode, and the plurality of reference points of the merge-wound electrode.

7. The apparatus of claim 6, wherein the roll map generator is configured to communicate with a display unit in which the roll map for simulating the merge-wound electrode is displayed.

8. The apparatus of claim 6, further comprising a controller configured to control a movement of the electrode between the unwinder and the rewinder,
wherein the controller is connected to the input device, the position measurement device, the seam detector, and the reference point detector to transmit the input signal of the input device, the coordinate value data about the longitudinal position of the electrode, the electrode coordinate values of the seam, and coordinate value data of the plurality of reference points of the merge-wound electrode to the roll map generator.

9. The apparatus of claim 6, wherein the roll map generator is configured to compare coordinate values of the plurality of reference points of the merge-wound electrode detected by the reference point detector with the one or more intervals between the plurality of reference points marked on the two or more electrodes to be merged to calculate a change amount of an electrode length during merge-winding and to utilize the change amount to correct the longitudinal coordinate values of the electrode on the roll map and display the corrected longitudinal coordinate values on the roll map.

10. The apparatus of claim 9, wherein the two or more electrodes to be merged are each marked with the plurality of reference points; and
    wherein the coordinate values of the plurality of reference points of the merge-wound electrodes derived from each of the two or more electrodes to be merged are compared with the one or more intervals between the plurality of reference points of each of the two or more electrodes to be merged to calculate the change amount of the electrode length during merging and winding of the two or more electrodes to be merged.

11. The apparatus of claim 10, wherein the coordinate values of the plurality of reference points of the merge-wound electrode derived from each of the two or more electrodes to be merged are compared with the one or more intervals between the plurality of reference points of each of the two or more electrodes to be merged and the electrode coordinate values of the seam acquired by the seam detector to calculate the change amount of the electrode length during merging and winding of the two or more electrodes to be merged.

12. The apparatus of claim 10, wherein a length of each of the one or more intervals between the plurality of reference points of each of the two or more electrodes to be merged are the same.

13. A method of generating a roll map of a merge-wound electrode by an apparatus, the method comprising:
    acquiring, when the merged-wound electrode moves in a roll-to-roll state between an unwinder and a rewinder, coordinate value data for a longitudinal position of the merged-wound;
    receiving an input signal indicating a start of merge-winding or an end of merge-winding, when two or more electrodes to be merged that are each marked with a plurality of reference points at one or more intervals are connected to be merged and wound into the merge-wound electrode;
    acquiring electrode coordinate values of a seam, which is a connection portion of two electrodes merged in the merge-wound electrode, when the seam is detected; and
    acquiring electrode coordinate values of a plurality of reference points of the merge-wound electrode, which corresponds to the plurality of reference points of the two or more electrodes to be merged, when the plurality of reference points of the merge-wound electrode are detected, wherein a roll map for simulating the merge-wound electrode is generated based on the input signal, the electrode coordinate values of the seam, and the electrode coordinate values of the plurality of reference points of the merge-wound electrode.

14. The method of claim 13, wherein the input signal is a splicing operation start or end signal for connecting the electrodes to be merged, which is automatically or manually input.

15. The method of claim 13, further comprises generating the roll map for simulating the merge-wound electrode that includes coordinate value data of the merge-wound electrode, and the plurality of reference points of the merge-wound electrode.

16. The method of claim 15, further comprises communicating with a display unit in which the roll map for simulating the merge-wound electrode is displayed.

17. The method of claim 15, further comprises comparing coordinate values of the plurality of reference points of the merge-wound electrode detected with one or more intervals between the plurality of reference points marked on the two or more electrodes to be merged to calculate a change amount of an electrode length during merge-winding and to utilize the change amount to correct the longitudinal coordinate values of the electrode on the roll map.

18. The method of claim 17, wherein the two or more electrodes to be merged are each marked with the plurality of reference points, the method comprises comparing the coordinate values of the plurality of reference points of the merge-wound electrodes derived from each of the two or more electrodes to be merged with the one or more intervals between the plurality of reference points of each of the two or more electrodes to be merged to calculate the change amount of the electrode length during merging and winding of the two or more electrodes to be merged.

19. The method of claim 18, further comprises comparing the coordinate values of the plurality of reference points of the merge-wound electrode derived from each of the two or more electrodes to be merged with the one or more intervals between the plurality of reference points of each of the two or more electrodes to be merged and the electrode coordinate values of the seam to calculate the change amount of the electrode length during merging and winding of the two or more electrodes to be merged.

20. The method of claim 18, wherein a length of each of the one or more intervals between the plurality of reference points of each of the two or more electrodes to be merged are the same.

* * * * *